United States Patent
Keyser et al.

(10) Patent No.: US 10,528,899 B2
(45) Date of Patent: Jan. 7, 2020

(54) CLADISTICS DATA ANALYZER FOR BUSINESS DATA

(71) Applicant: International Business Machines Corporation, Armonk, NY (US)

(72) Inventors: Paul T. Keyser, New York, NY (US); Szabolcs Rozsnyai, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 540 days.

(21) Appl. No.: 14/037,350

(22) Filed: Sep. 25, 2013

(65) Prior Publication Data

US 2014/0164035 A1 Jun. 12, 2014

Related U.S. Application Data

(63) Continuation of application No. 13/707,565, filed on Dec. 6, 2012, now abandoned.

(51) Int. Cl.
*G06Q 10/06* (2012.01)

(52) U.S. Cl.
CPC .................. *G06Q 10/063* (2013.01)

(58) Field of Classification Search
CPC ...... G06Q 10/00; G06Q 40/00; G06Q 10/063; G06Q 40/06; G06F 17/60
USPC ....................................................... 705/7.29
See application file for complete search history.

(56) References Cited

U.S. PATENT DOCUMENTS

| | | | | |
|---|---|---|---|---|
| 7,389,306 | B2 * | 6/2008 | Schuetze ............. | G06F 17/3092 707/602 |
| 7,661,135 | B2 * | 2/2010 | Byrd ................... | G06F 11/3476 726/11 |
| 7,818,150 | B2 * | 10/2010 | Barnett ............... | G06F 11/3447 703/6 |
| 8,676,818 | B2 * | 3/2014 | Curbera ............ | G06F 17/30958 707/755 |
| 9,165,333 | B2 * | 10/2015 | Hoffmann .............. | G06Q 10/06 |
| 2003/0145105 | A1 * | 7/2003 | Desineni ............. | H04L 12/2697 709/238 |
| 2006/0047805 | A1 * | 3/2006 | Byrd ................... | G06F 11/3476 709/224 |
| 2008/0059625 | A1 * | 3/2008 | Barnett ............... | G06F 11/3495 709/223 |

(Continued)

OTHER PUBLICATIONS

Saitou et al (Neighbor-Joining Method: A New Method foe reconstructing PhylogeneticTrees) discloses an algorithm of tree making, Dec. 1987, Center for Demographic and Population Genetics, The University of Texas Health Science Center at Houston, pp. 1-100.*

(Continued)

*Primary Examiner* — Romain Jeanty
(74) *Attorney, Agent, or Firm* — Ido Tuchman; Rahan Uddin

(57) ABSTRACT

An analyzer system may include a computer-apparatus to collect traces from a pool of business traces, and to assign an unique vector value to each trace. The system may also include an assembler to create a tree based upon the unique vector value of each trace. The system may further include an analyzer to detect sub-trees within the tree to identify similarities among the traces based upon the traces inclusion within a given sub-tree.

21 Claims, 10 Drawing Sheets

(56) References Cited

U.S. PATENT DOCUMENTS

2010/0005346 A1 1/2010 Hamlescher et al.
2011/0219044 A1 9/2011 Peukert

OTHER PUBLICATIONS

Astudillo (Evaluation and Realization of Modeling Alternatives: Supporting Derivation and Enhancement), Apr. 1996, Georgia Institute of Technology, pp. 1-227.*
Bock (2007) H.-H. Bock, "Clustering Methods: A History of k-Means Algorithms," Selected Contributions in Data Analysis and Classification=Studies in Classification, Data Analysis, and Knowledge Organization (2007) Part II, 161-172.
Eagleton & Spencer (2006) Catherine Eagleton & Matthew Spencer, "Copying and conflation in Geoffrey Chaucer's Treatise on the astrolabe: a stemmatic analysis using phylogenetic software," Studies in History and Philosophy of Science 37 (2006) 237-268.
Edwards (2009) A.W.F. Edwards, "Satistical Methods for Evolutionary Trees," Genetics 183 2009) 5-12.
Fernandex & Gomez (2008) Alberto Fernandez & Sergio Gomez, "Solving Non-Uniqueness in Agglomerative Hierarchical Clustering using Multidendrograms," Journal of Classification 25 (2008) 43-65.
Fitch & Margoliash "Construction of Phylogenetic Trees" Science 155 (1967) 279-284.
Gordon "A Review of Hierarchical Classification," Journal of the Royal Statistical Society. Series A (General) 150.2 (1987) 119-137.
Hartigan, "Statistical Theory in Clustering," Journal of Classification 2 (1985) 63-76.
U.S. Appl. No. 13/289,176, filed Nov. 4, 2011, DePauw et al.
Gronau et al., "Optimal implementations of UPGMA and other common clustering algorithms," Information Processing Letters 1014 (2007) 205-210.
Navarro, "A Guided Tour to Approximate String Matching," ACM Computing Surveys 33.1 (201) 31-88.
Saitou et al., "The Neighbor-joining method: A New Method fo Reconstruction Phylogenetic Trees," Molecular Biology & Evolution 4.4 (1987) 406-425.

* cited by examiner

CLADISTICS DATA ANALYZER FOR BUSINESS DATA

CROSS-REFERENCE TO RELATED APPLICATIONS

This application claims priority under 35 U.S.C. § 120 to U.S. patent application Ser. No. 13/707,565 filed Dec. 6, 2012, the entire text of which is specifically incorporated by reference herein.

BACKGROUND

The disclosure relates to the field of computer systems, and, more particularly, to data analysis using computer systems.

Case-workers, business-process analysts, and others need to inspect large sets of process-traces, and to form meaningful subsets of them, for study. However, the number of traces to be inspected, and the amount of data in each one, is so large that the task of inspection and aggregation into subsets is very hard.

SUMMARY

In one embodiment, an analyzer system may include a computer-apparatus to collect traces from a pool of business traces, and to assign an unique vector value to each trace. The system may also include an assembler to create a hierarchal tree based upon the unique vector value of each trace. The system may further include an analyzer to detect sub-trees within the tree to identify similarities among the traces based upon the traces inclusion within a given branch of the tree.

Another aspect is a method for trace analysis, which may include collecting with a computer-apparatus traces from a pool of business traces, and assigning a unique vector value to each trace. The method may also include creating a hierarchal tree based upon the unique vector value of each trace. The method may further include generating an output by detecting sub-trees within the tree to identify similarities among the traces based upon the traces inclusion within a given branch of the tree.

Yet another aspect of the present invention is a computer program product having computer readable program codes configured to cause the program to: collect with a computer-apparatus traces from a random pool of business traces; assign a unique vector value to each trace; create a hierarchal tree based upon the unique vector value of each trace; and generate an output by detecting sub-trees within the tree to identify similarities among the traces based upon the traces inclusion within a given branch of the tree.

DETAILED DESCRIPTION

Embodiments will now be described more fully hereinafter with reference to the accompanying drawings, in which preferred embodiments are shown. Like numbers refer to like elements throughout.

Figure 1:
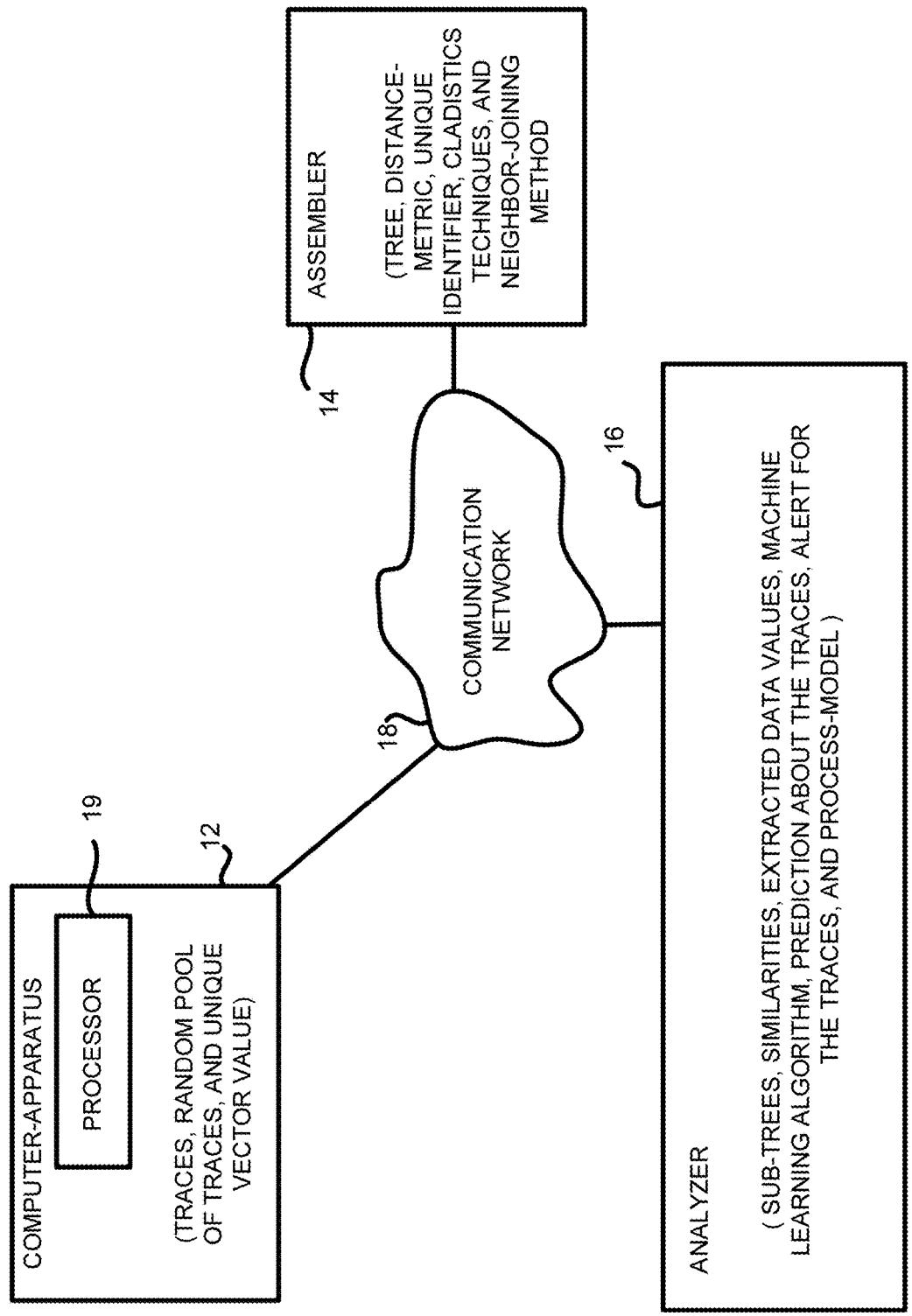
FIG. 1 is a block diagram illustrating a data analyzer system in accordance with various embodiments.
Figure 2:
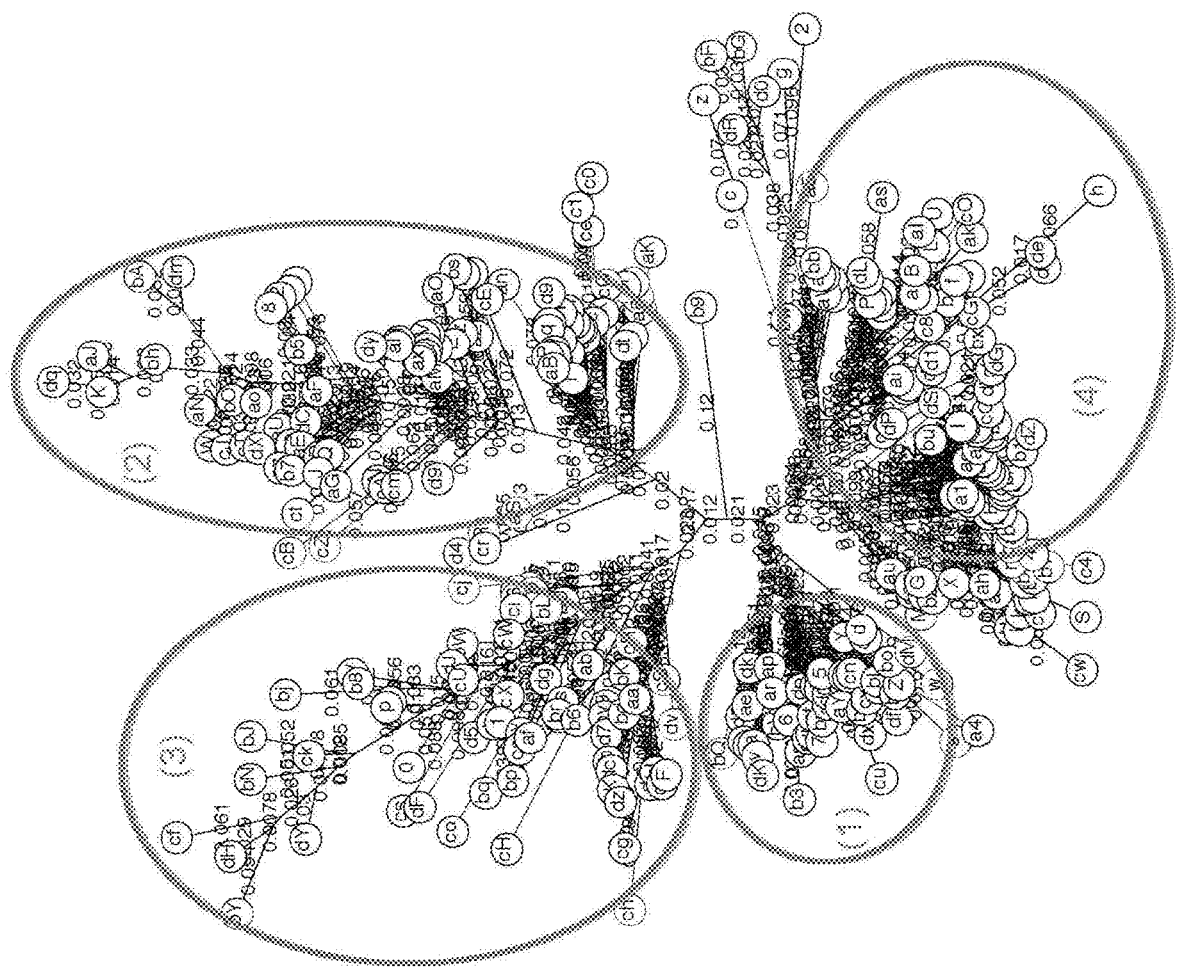
FIG. 2 is a tree diagram illustrating sub-trees identified by the system of FIG. 1.

With reference now to FIGS. 1 and 2, a data analyzer system 10 is initially described. In an embodiment, the system 10 includes a computer-apparatus 12 to collect traces from a pool of business traces, and to assign an unique vector value to each trace. The system 10 also includes an assembler 14 to create a hierarchal tree based upon the unique vector value of each trace. The system 10 further includes an analyzer 16 to detect sub-trees within the tree to identify similarities among the traces based upon the traces inclusion within a given branch or sub-tree of the hierarchal tree.

In one embodiment, the assembler 14 determines a distance-metric as part of the unique vector. In another embodiment, the system 10 uses a distance metric as a way to determine the proximity of traces (i.e. how similar they are). In another embodiment, the assembler may assign a unique identifier as part of the unique vector.

In one embodiment, the analyzer 16 extracts data values that determine the similarities among the traces within a given branch or sub-tree of the hierarchal tree. In another embodiment, the analyzer 16 uses the traces of a selected sub-tree to train a machine-learning algorithm to make a prediction about the traces.

In one embodiment, the analyzer 16 uses the traces of a selected sub-tree to train a machine-learning algorithm to create an alert for the traces. In another embodiment, the analyzer 16 builds a process-model based on a selected sub-tree's traces.

In one embodiment, the pool of business traces is not based upon a business model. In another embodiment, the pool of business traces is not based upon cluster size.

In one embodiment, the assembler 14 uses cladistics techniques to produce the tree. In another embodiment, the cladistics technique used to produce the tree comprises the neighbor-joining method. In another embodiment, the assembler 14 and/or the analyzer 16 comprises a machine-component of the computer-apparatus.

In one embodiment, the system 10 includes a communications network 18, which enables a signal to travel anywhere within system 10 and/or to any other system connected to system 10. The communications network 18 is wired and/or wireless, for example. The communications network 18 is local and/or global with respect to system 10, for instance. In another embodiment, the computer-apparatus 12 includes a processor 19.

Figure 3:
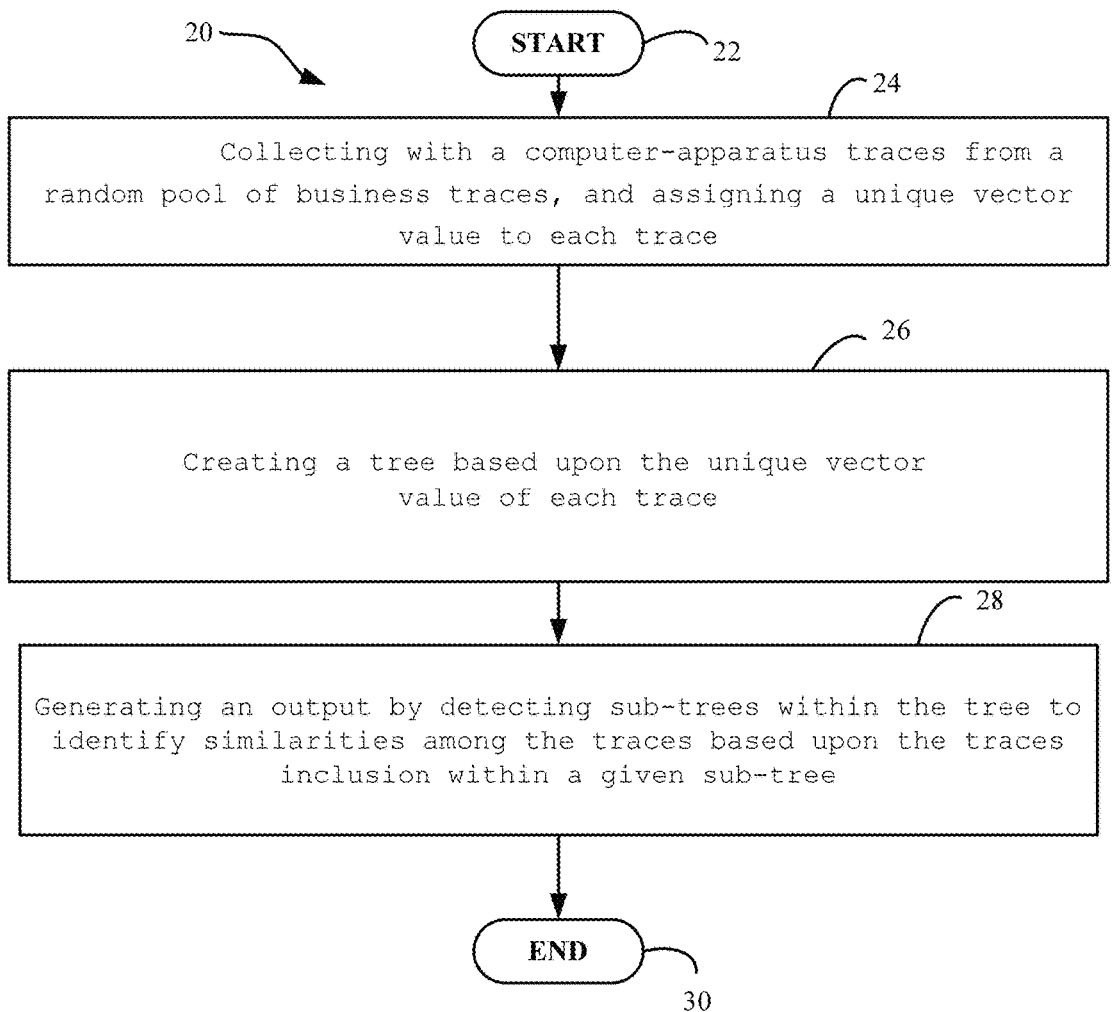
FIG. 3 is a flowchart illustrating method aspects according to various embodiments.

Another aspect is a method for trace analysis, which is now described with reference to flowchart 20 of FIG. 3. The method begins at Block 22 and may include collecting with a computer-apparatus traces from a random pool of business traces, and assigning a unique vector value to each trace at Block 24. The method may also include creating a tree based upon the unique vector value of each trace at Block 26. The method may further include generating an output by detecting sub-trees within the tree to identify similarities among the traces based upon the traces inclusion within a given sub-tree at Block 28. The method ends at Block 30.

Figure 4:
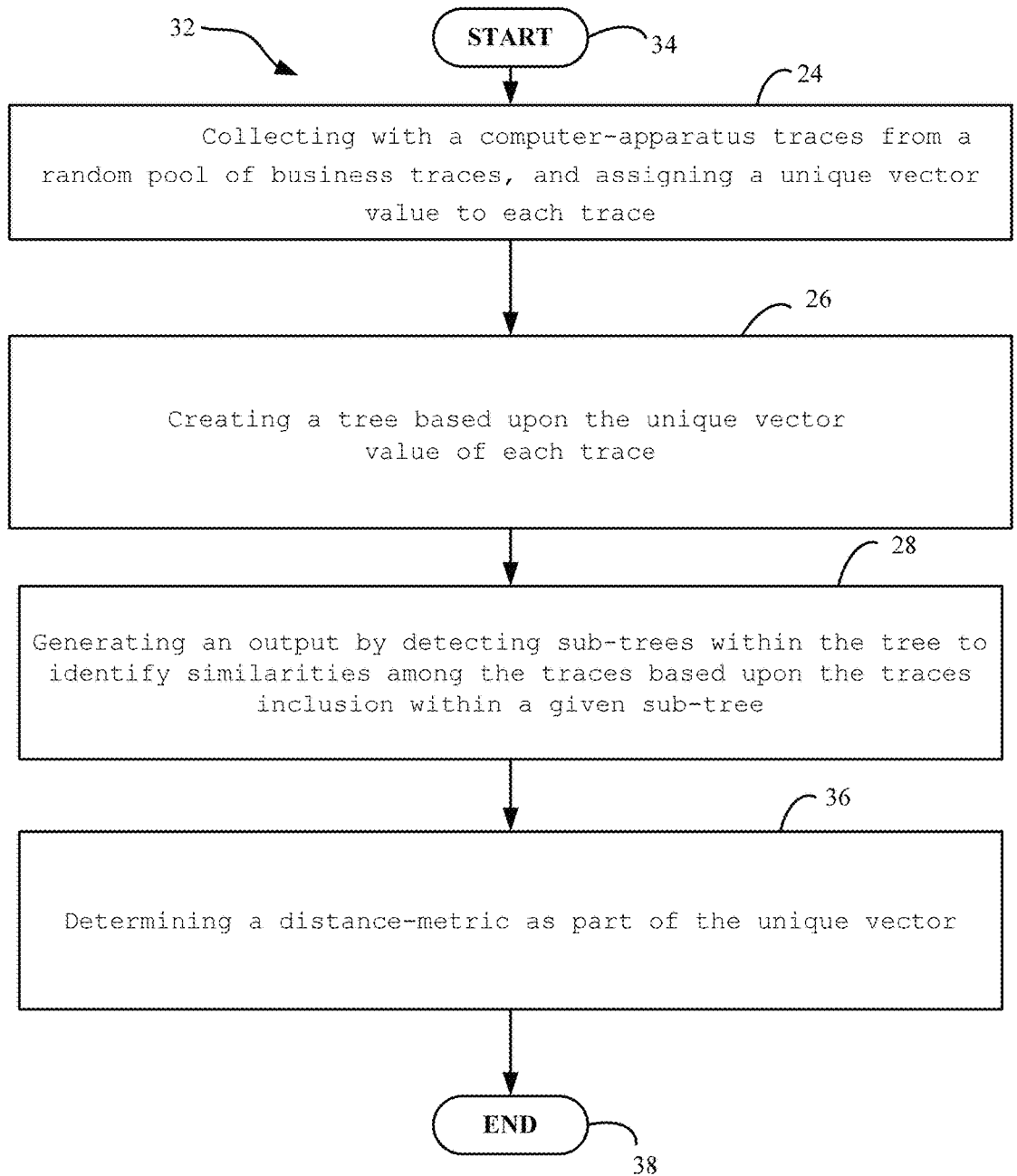
FIG. 4 is a flowchart illustrating method aspects according to the method of FIG. 3.

In another method embodiment, which is now described with reference to flowchart 32 of FIG. 4, the method begins at Block 34. The method may include the steps of FIG. 3 at Blocks 24, 26, and 28. The method may additionally include determining a distance-metric as part of the unique vector at Block 36. The method ends at Block 38.

Figure 5:
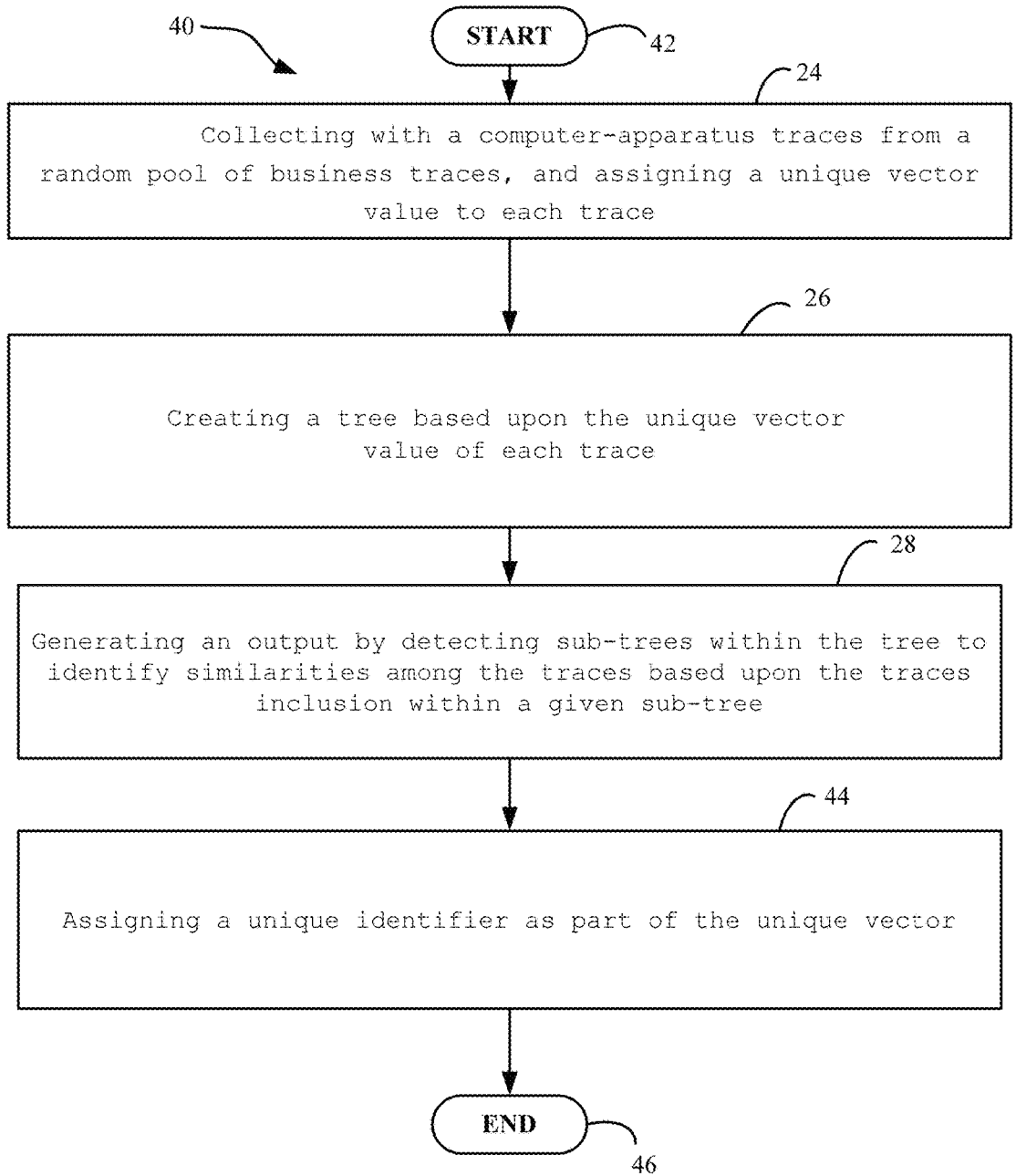
FIG. 5 is a flowchart illustrating method aspects according to the method of FIG. 3.

In another method embodiment, which is now described with reference to flowchart 40 of FIG. 5, the method begins at Block 42. The method may include the steps of FIG. 3 at Blocks 24, 26, and 28. The method may also include assigning a unique identifier as part of the unique vector at Block 44. The method ends at Block 46.

Figure 6:
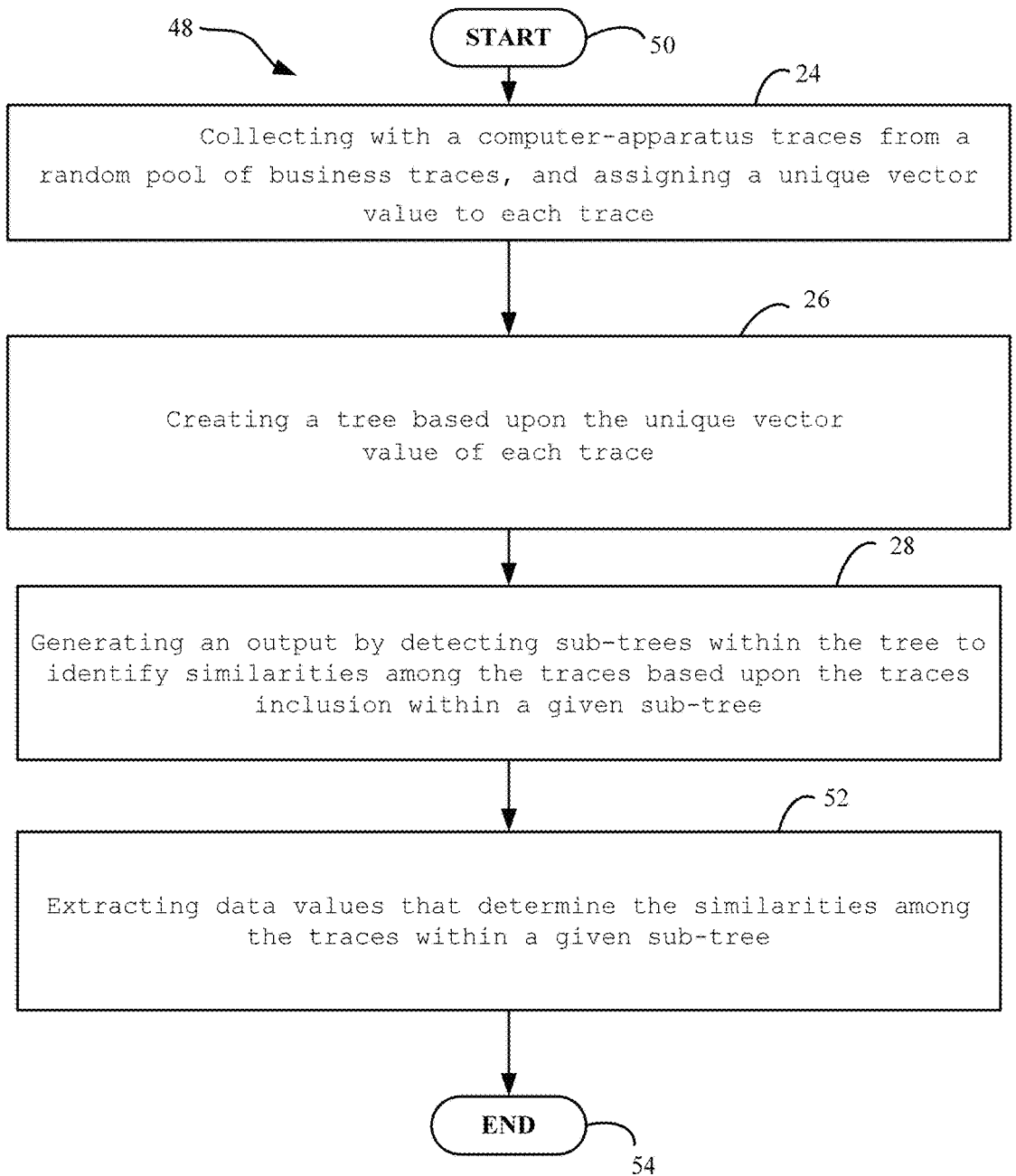
FIG. 6 is a flowchart illustrating method aspects according to the method of FIG. 3.

In another method embodiment, which is now described with reference to flowchart 48 of FIG. 6, the method begins at Block 50. The method may include the steps of FIG. 3 at Blocks 24, 26, and 28. The method may further include extracting data values that determine the similarities among the traces within a given sub-tree at Block 52. The method ends at Block 54.

Figure 7:
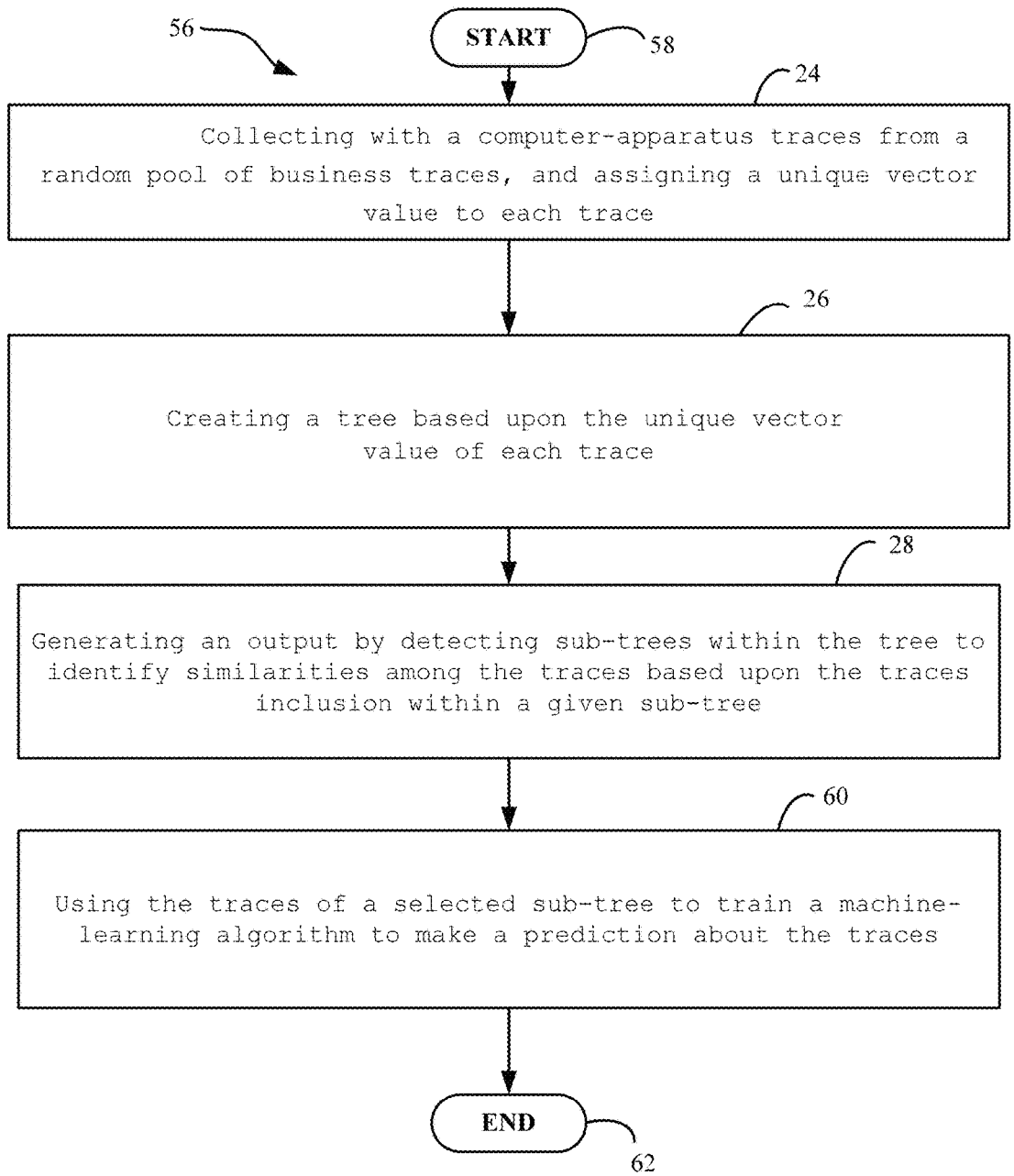
FIG. 7 is a flowchart illustrating method aspects according to the method of FIG. 3.

In another method embodiment, which is now described with reference to flowchart 56 of FIG. 7, the method begins at Block 58. The method may include the steps of FIG. 3 at Blocks 24, 26, and 28. The method may additionally include using the traces of a selected sub-tree to train a machine-learning algorithm to make a prediction about the traces at Block 60. The method ends at Block 62.

Figure 8:
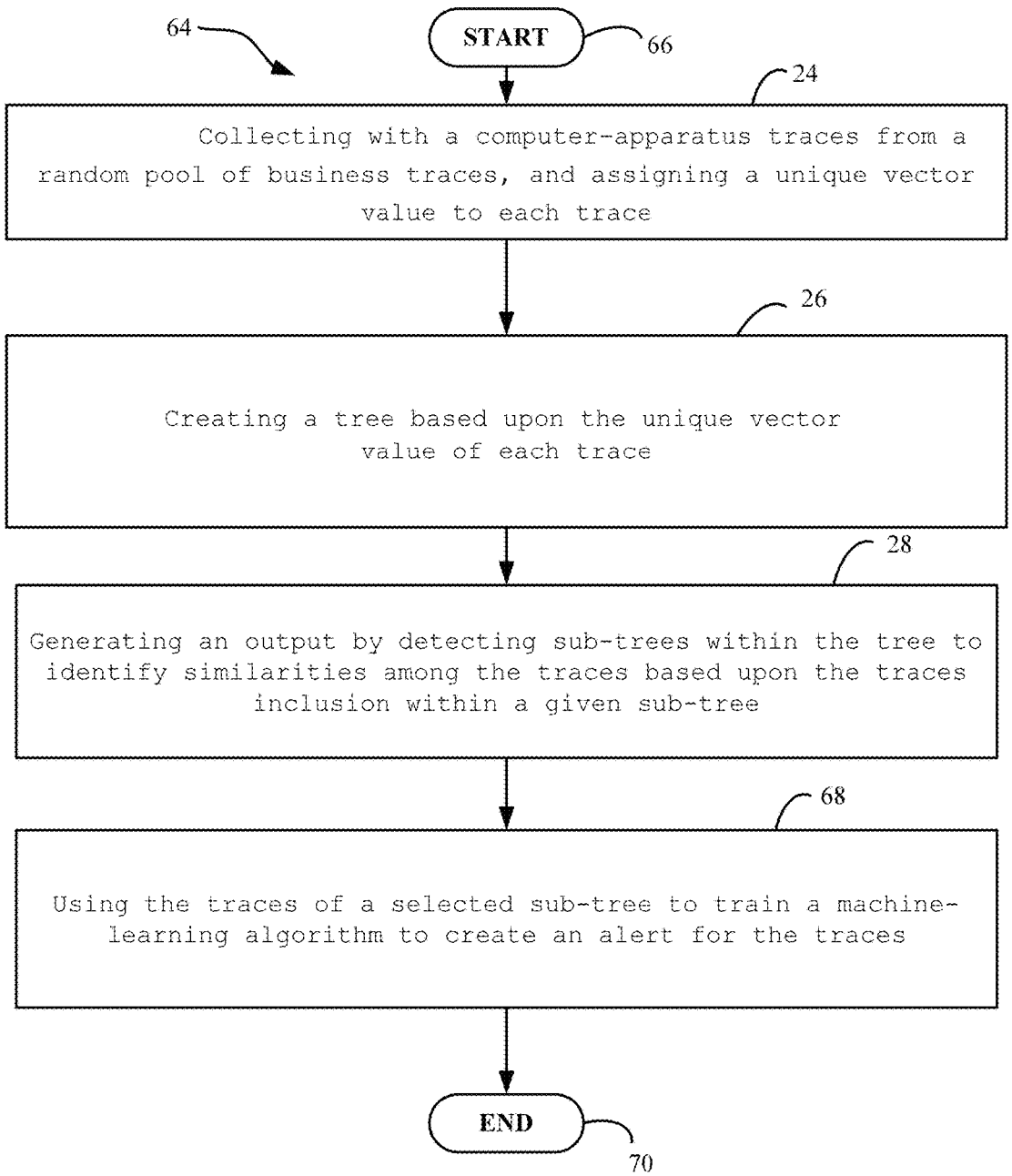
FIG. 8 is a flowchart illustrating method aspects according to the method of FIG. 3.

In another method embodiment, which is now described with reference to flowchart 64 of FIG. 8, the method begins at Block 66. The method may include the steps of FIG. 3 at Blocks 24, 26, and 28. The method may also include using the traces of a selected sub-tree to train a machine-learning algorithm to create an alert for the traces at Block 68. The method ends at Block 70.

Figure 9:
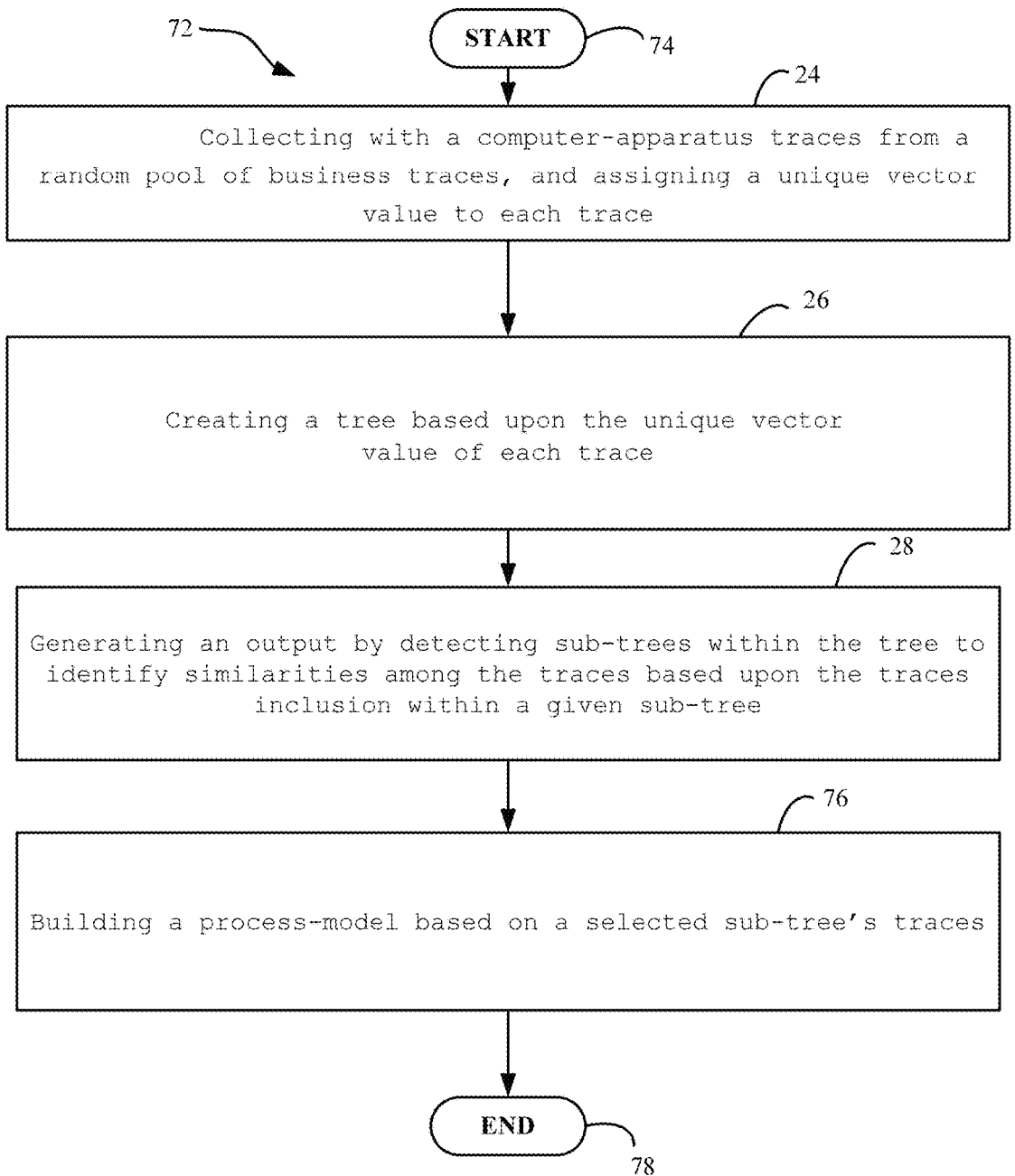
FIG. 9 is a flowchart illustrating method aspects according to the method of FIG. 3.

In another method embodiment, which is now described with reference to flowchart 72 of FIG. 9, the method begins at Block 74. The method may include the steps of FIG. 3 at Blocks 24, 26, and 28. The method may further include building a process-model based on a selected sub-tree's traces at Block 76. The method ends at Block 78.

Figure 10:
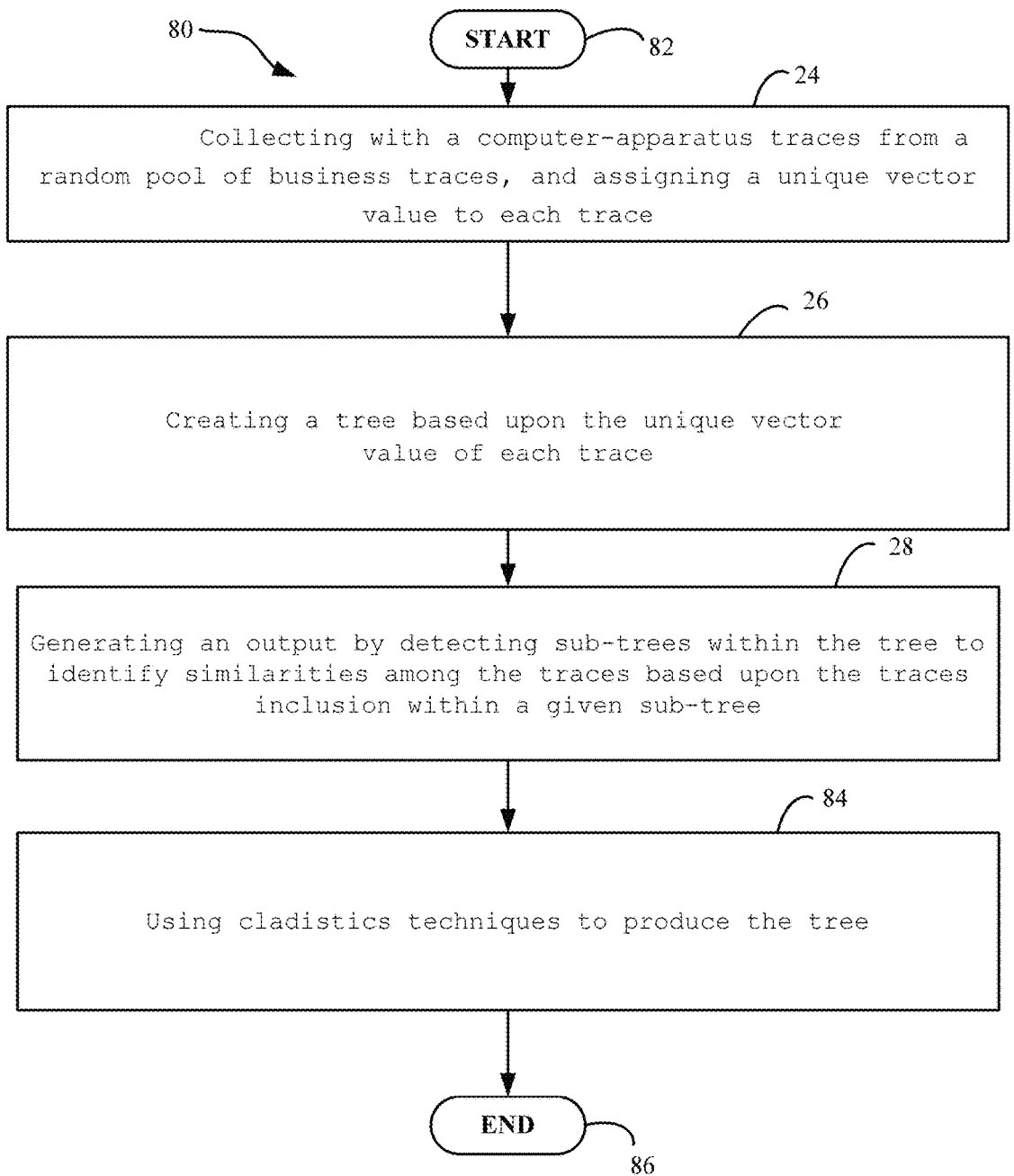
FIG. 10 is a flowchart illustrating method aspects according to the method of FIG. 3.

In another method embodiment, which is now described with reference to flowchart 80 of FIG. 10, the method begins at Block 82. The method may include the steps of FIG. 3 at Blocks 24, 26, and 28. The method may additionally include using cladistics techniques to produce the tree at Block 84. The method ends at Block 86.

In view of the foregoing, the system 10 provides analysis of traces that before now was impossible to achieve. For example, within a process (or case) is any sequence of steps or tasks, executed either by people or automatically, each step or task of which records some data in a log-file, at a minimum the name of the step or task executed, a time-stamp, and usually some data about what was done (such as order-number, customer-number, price, item-type, shipping-destination, or other numerical or categorical data). The process instance or case instance as a whole is defined through correlation rules. A correlation rule is a semantic rule that specify how certain events are related to each other. Single correlation rules are typically not capable of isolating specific patterns, such as a process instance, that are of interest. Therefore, it is useful to combine several correlation rules in order to be able to define a correlation that includes all events that share a relationship in a certain context.

In one embodiment, the process instance or case instance as a whole is defined as such either by having some common ID for all tasks executed within it, or in some other way, so long as there is a well-defined list of tasks that form any given process or case instance. The record of a given process or case instance in the log is referred to as the "trace".

The formation of the subsets, referred to as the "aggregation", can be done by finding, e.g., all traces that contain a given city-value in some field, say the "shipTo" field (thus, each of {Boston, New York, Chicago, . . . } would define a subset) or else by finding all traces that contain a given task (thus each of {LoginUser, ValidateAccount, OrderProduct, ValidatePaymentMethod, . . . } would define a subset), and so on, in various combinations. However, it is very often desired to find all traces that are "similar" to a given trace or to one another, because the analyst expects that such similarities will reveal patterns that cannot be detected by looking at individual data-fields.

Existing solutions aggregate traces into sets based either on an automated version of the system described ("find all traces with shipTo=Boston AND shipDate >2012 April AND . . . ") or else based on correlating various values of the data, such as order-numbers or customer-numbers. Such systems perform well, but will regularly miss the kinds of similarities that depend not on data-values whose identity can be specified in advance (such as "the shipTo Field" or "the customer-number"), but on patterns in the data as a whole. In one embodiment, system 10 can find similarity patterns based on the sequence of tasks (events) instead of similarities that depend on data-values of tasks.

System 10 provides a way to automatically aggregate large numbers of traces, when analysts have little or no a priori knowledge about the ways in which they might be similar. All that is required is access to the data of the traces.

System 10 is inspired by the biological discipline of "cladistics", in which the goal is to create a certain kind of data-structure called a "cladogram". The essence of the technique is to aggregate items to form larger and larger sets, until the whole data-set has been aggregated; doing this forms a tree, whose leaf-nodes are the actual items, and whose interior nodes represent the similarity-set formed of their children. The technique is thus "bottom-up". Biologists have been successfully using this technique to study relationships among species, genera, families, etc.

Cladistics is a robust technique that has been applied to areas well outside biology, where some of the same assumptions apply, for example in the classification of manuscripts.

Cladistics is distinct from the method called "K-means", a "top-down" process, which is a division (not agglomeration) process, requires supplying the K-value (number of clusters) as an input, and uses only Euclidean distance (so that all data must be numeric). Supplying an incorrect or sub-optimal value for "K" will usually result in poor performance.

Cladistics is distinct from "hierarchical cluster analysis", which recursively divides the initial cluster of data into smaller and smaller sets, which is also a "top-down" method. The algorithms for hierarchical cluster analysis tend to be much slower (usually running in exponential time) than agglomerative clustering.

The goal of cladistics is to take a large number of entities (species) and determine a tree of relationships, so that closely-related species are close together on the tree. Then, a sub-tree can be treated as a valid sub-group of the whole set of species, and in this way biologists determine the exact membership of species in genera, and genera in families, and families in orders, and so on.

The method of cladistics requires that we have a "distance metric" between species, i.e., a way to measure a "distance" between any two species. Such a "distance" must be: (1) non-negative, (2) zero only when the entities are the "same", and (3) obey the triangle inequality, Distance(A,C)<=Distance(A,B)+Distance(B,C), for any three entities A, B, C. However, there is no requirement that the distance be the ordinary "Euclidean" distance as on a planar map. Indeed, some metrics even obey the "ultrametric" inequality: Distance(A,C)<=max{Distance(A,B), Distance(B,C)}.

In contrast, system 10 collects N distinct "species" of the process-instance being studied, i.e., N distinct traces (as defined above); this is analogous to collecting N distinct biological species (or N distinct manuscripts of a given work). This step of collecting the traces may done in any of the standard ways known to practitioners of the art.

System 10 also develops a distance-metric for those traces, i.e. "species". This will involve first being able to assign some vector of values to each species. For example, when the species are biological, either character traits or else DNA sequences are used, and the vectors of values are in effect strings. In that case, various forms of edit-distance metrics are used, as is well-known in that literature. For process-traces, system 10 operates using at least most of the following steps.

(1) To each distinct kind of task, arranged in an ordered list (where the order can be any specified ordering and need not be alphabetic, but may be alphabetic), a single unicode character is assigned, thus, e.g., with task-kinds as noted above, {LoginUser, ValidateAccount, OrderProduct, ValidatePaymentMethod, . . . }, system 10 might assign the characters {'a', 'b', 'c', 'd', . . . }; it is to be noted that we are not restricted to letters of the Latin alphabet or even to ASCII, and that the total number of unicode characters available is sufficient even for unreasonably complex processes.

(2), if desired, system 10 may also take each categorical variable and map its values also to single unicode characters, thus, e.g., if we had a categorical variable "AccountType" whose known enumerated list of values, arranged in an ordered list (where the order can be any specified ordering and need not be alphabetic, but may be alphabetic), was, e.g., {Corporate, Small_Business, Government_USA, Government_Foreign, Private, Non_Profit}, we could assign characters such as {'A', 'B', 'C', 'D', 'E', 'F'}. NOTE: that it is to be understood that no character is used more than once in any of these assignments, whether to data-values or to task-names; the characters need not, but may for simplicity, be assigned in standard unicode order. NOTE: it is to be understood that any data that is not categorical may be transformed by suitable methods, known to practitioners of the art, into categorical values.

(3), each trace can be mapped to an unambiguous string by concatenating the characters of all, or any defined subset of, its tasks, in order, and all, or any defined subset of, its categorical-data-variables, in any one of many possible specified orders (the data-variable may be concatenated in alphabetical order of their name, e.g.).

(4), system 10 can use either (a) any one of many standard string-edit distance metrics, known to those expert in the art, such as, but not limited to, either the Damerau-Levenstein or the Jaro-Winkler metrics, or else (b) use as the distance between two traces the multiplicative inverse of the length of the longest common prefix, which will be an ultrametric. System 10 is not restricted to the use of these two kinds of metrics, and other ways of determining the distance between traces may be used, whether or not the mappings described in (1) and (2) above are used.

System 10 also creates the cladogram tree using one of several methods, such as, but not limited to, the neighbor-joining (NJ) method, standard in the biological use of cladograms, and one example of an alternate method is "fast" NJ. The NJ algorithm runs in Order(N^3) time worst case. If system 10 uses an ultrametric, it can use (i) the "Unweighted Pair Group Method with Arithmetic Mean" algorithm, or else (ii) the algorithm of Fouchal, Ahat, & Lavallée, and/or the like. Both of the noted algorithms are much faster than Order(N^3).

The tree, i.e. cladogram, that has been created in above can be displayed or exported by any of the standard methods known to those expert in the art. The process analyst or case worker can then inspect the cladogram and define suitable sub-trees as "genera" or "families" of traces, for further study. Alternatively, the sub-trees can be extracted by any of various semi-automated methods such as, but not limited to, this method: for node K, if Distance(parent,K)>max(Distance(K,kids)), where "parent" refers to the parent of "K" and "kids" refers to all the children of "K", then split the tree at K, defining K and all its descendants as a "genus".

Some in the prior art inspect the whole tree from its root downward to one of its leaves seeking the "best" single model. In contrast, system 10 inspects the tree descending only a few levels and looking for possibly several "splittings" of the tree.

Referring back to FIG. 2, each sub-tree identified by system 10 is circled in red (the circles indicate the tree, without necessarily including exactly and only the nodes of the indicated tree). There are four sub-trees, suggesting to the user that the set of traces can be meaningfully divided into 4 disjoint sets, each for further study to identify what that similarity is.

Moreover instead of seeking a single node on the tree, the system 10 is interested in identifying a small number of entire sub-trees, whose traces will then be studied in some other manner. That is, this method seeks to find aggregations of traces which are "sufficiently similar" according to the constructed cladogram.

System 10 can use the splits, i.e. sub-trees. For instance, the traces in any sub-tree are more like each other than they are like the traces in any other sub-tree; therefore system 10 can meaningfully exploit the traces in a sub-tree for any of the purposes known to those expert in the art, such as, but not limited to: (i) extracting data-values that determine the similarity, (ii) using the traces of the sub-tree to train machine-learning algorithms to make predictions or create alerts, (iii) building a process-model based only on those traces, etc.

The prior art does nothing with the rest of the cladogram, after having identified the "best" model. Their purpose is to compare process-models for the purpose of identifying the "best" one.

The system 10 is directed to analyzing business processes. Specifically, system 10 uses a concept from biology called "cladistics", but applied to business processes in order to return a graph of the business processes grouped into hierarchical relationships. No business model is necessary to cluster the processes, nor does any cluster size need to be given. The business process events in a trace are treated as distinct entities making up a sequence. Each trace is then treated as a species (according to cladistics terms) and a distance metric is defined to determine how similar each trace is to another. In other words, no knowledge is necessary to show how closely related a given trace is to another trace, each event is treated merely as a distinct entity, and can even be assigned a letter, number, unique vector value, and/or the like.

As will be appreciated by one skilled in the art, aspects may be embodied as a system, method, and/or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments are described above with reference to flowchart illustrations and/or block diagrams of methods, apparatus (systems) and computer program products according to the embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the various embodiments with various modifications as are suited to the particular use contemplated.

While the preferred embodiment has been described, it will be understood that those skilled in the art, both now and in the future, may make various improvements and enhancements which fall within the scope of the claims which follow. These claims should be construed to maintain the proper protection for the embodiments first described.

What is claimed is:

1. A computer implemented method comprising:
   collecting with a computer-apparatus traces from a pool of business traces;
   assigning by the computer-apparatus a unique vector value to each trace;
   creating by the computer-apparatus a hierarchical tree based upon the unique vector value of each trace;
   generating by the computer-apparatus an output by detecting sub-trees within the tree to identify similarities among the traces based upon the traces inclusion within a given branch of the tree; and
   using traces of a selected sub-tree from the sub-trees to train a machine-learning algorithm to make a prediction about the traces; and
   wherein the given branch of the tree is associated with a shipment region and the traces with identified similarities include a same shipping region.

2. The method of claim 1 further comprising determining a distance-metric as part of the unique vector.

3. The method of claim 1 further comprising assigning a unique identifier as part of the unique vector.

4. The method of claim 1 further comprising extracting data values that determine the similarities among the traces within the given branch of the tree.

5. The method of claim 1 further comprising using the traces of the selected sub-tree to create an alert for the traces.

6. The method of claim 1 further comprising building a process-model based on traces corresponding to a selected branch of the tree.

7. The method of claim 1 wherein the pool of business traces is not based upon a business model.

8. The method of claim 1 wherein the pool of business traces is not based upon cluster size.

9. A computer implemented method comprising:
   collecting with a computer-apparatus traces from a pool of business traces;
   assigning by the computer-apparatus a unique vector value to each trace;
   creating by the computer-apparatus a hierarchical tree based upon the unique vector value of each trace;
   using cladistics techniques by the computer-apparatus to produce the tree;
   generating by the computer-apparatus an output by detecting sub-trees within the tree to identify similarities among the traces based upon the traces inclusion within a given branch of the tree; and
   using traces of a selected sub-tree from the sub-trees to train a machine-learning algorithm to make a prediction about the traces;
   wherein the cladistics technique used to produce the tree comprises the neighbor-joining method; and
   wherein the given branch of the tree is associated with a shipment region and the traces with identified similarities include a same shipping region.

10. The method of claim 9, wherein the given branch of the tree is associated with a shipment region and the traces with identified similarities include a same shipping region.

11. The method of claim 9, further comprising determining a distance-metric as part of the unique vector.

12. The method of claim 9, further comprising assigning a unique identifier as part of the unique vector.

13. The method of claim 9, further comprising extracting data values that determine the similarities among the traces within the given branch of the tree.

14. The method of claim 9, further comprising using the traces of the selected sub-tree to create an alert for the traces.

15. The method of claim 9, further comprising building a process-model based on traces corresponding to a selected branch of the tree.

16. The method of claim 9, wherein the pool of business traces is not based upon a business model.

17. A computer implemented method comprising:
    collecting with a computer-apparatus traces from a pool of business traces;
    assigning by the computer-apparatus a unique vector value to each trace;
    creating by the computer-apparatus a hierarchical tree based upon the unique vector value of each trace;
    generating by the computer-apparatus an output by detecting sub-trees within the tree to identify similarities among the traces based upon the traces inclusion within a given branch of the tree; and
    using traces of a selected sub-tree from the sub-trees to train a machine-learning algorithm to make a prediction about the traces.

18. The method of claim 17 further comprising determining a distance-metric as part of the unique vector.

19. The method of claim 17 further comprising assigning a unique identifier as part of the unique vector.

20. The method of claim 17 further comprising extracting data values that determine the similarities among the traces within the given branch of the tree.

21. The method of claim 17, further comprising extracting data values that determine the similarities among the traces within the given branch of the tree.

* * * * *